US010540457B2

(12) United States Patent
Deodhar et al.

(10) Patent No.: US 10,540,457 B2
(45) Date of Patent: Jan. 21, 2020

(54) SYSTEM AND METHOD FOR PREDICTING THERMAL-INSIGHTS OF A DATA CENTER

(71) Applicant: Tata Consultancy Services Limited, Mumbai (IN)

(72) Inventors: Anirudh Deodhar, Pune (IN); Harshad Girish Bhagwat, Pune (IN); Amarend Kumar Singh, Pune (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 306 days.

(21) Appl. No.: 15/039,729

(22) PCT Filed: Feb. 25, 2014

(86) PCT No.: PCT/IN2014/000120
§ 371 (c)(1),
(2) Date: May 26, 2016

(87) PCT Pub. No.: WO2015/075727
PCT Pub. Date: May 28, 2015

(65) Prior Publication Data
US 2016/0378891 A1    Dec. 29, 2016

(30) Foreign Application Priority Data
Nov. 25, 2013 (IN) .......................... 3700/MUM/2013

(51) Int. Cl.
*G06F 11/00* (2006.01)
*G06F 11/30* (2006.01)
(Continued)

(52) U.S. Cl.
CPC .......... *G06F 17/5009* (2013.01); *G06F 11/00* (2013.01); *G06F 11/3006* (2013.01);
(Continued)

(58) Field of Classification Search
CPC ...... G06F 17/5009; G06F 17/18; G06F 11/00; G06F 2217/16; G06F 17/50;
(Continued)

(56) References Cited

U.S. PATENT DOCUMENTS 7,644,051 B1    1/2010 Moore et al.
8,712,735 B2 *  4/2014 VanGilder .......... H05K 7/20836
                                                    703/1
(Continued)

*Primary Examiner* — Juan C Ochoa
(74) *Attorney, Agent, or Firm* — Finnegan, Henderson, Farabow, Garrett & Dunner LLP

(57) ABSTRACT

Disclosed is a method for real-time prediction of thermal-insights for a heat dissipating device in a data center cooled by one or more cooling units. The method uses a concept of influence mass fractions in conjunction with proper orthogonal decomposition (POD) based reduced order model. It may be understood that, the influence mass fractions may be computed by performing a fixed number of CFD simulations based on mass flow rates of the one or more cooling units. The method further facilitates to identify a set of reference scenarios for a given range of operational parameters of the one or more cooling units impacting the heat dissipating device. The set of reference scenarios may then be provided to the POD in order to predict the thermal-insights of the data center such as a temperature, mass flow rate, and insights into thermal influence of air sources on the heat dissipating device.

13 Claims, 9 Drawing Sheets

(51) Int. Cl.
     *G06F 17/50*    (2006.01)
     *H05K 7/20*     (2006.01)
     *G06F 17/18*    (2006.01)
(52) U.S. Cl.
     CPC .......... *G06F 11/3062* (2013.01); *G06F 17/18*
          (2013.01); *G06F 17/50* (2013.01); *H05K*
          *7/20836* (2013.01); *G06F 2217/16* (2013.01);
                              *G06F 2217/80* (2013.01)
(58) Field of Classification Search
     CPC ............. G06F 11/3006; G06F 11/3062; G06F
                                  2217/80; H05K 7/20836
     USPC .......................................................... 703/2
     See application file for complete search history.

(56) References Cited

U.S. PATENT DOCUMENTS

| | | | |
|---|---|---|---|
| 8,731,883 B2* | 5/2014 | Hamann ................. | G06F 1/206 |
| | | | 703/5 |
| 8,949,091 B2* | 2/2015 | Bhagwat ............ | H05K 7/20836 |
| | | | 703/5 |
| 8,992,074 B2* | 3/2015 | Kramer ................ | G01K 15/005 |
| | | | 374/1 |
| 2011/0301911 A1 | 12/2011 | VanGilder et al. | |
| 2012/0059628 A1 | 3/2012 | VanGilder et al. | |
| 2013/0166258 A1 | 6/2013 | Hamann et al. | |
| 2013/0308674 A1 | 11/2013 | Kramer et al. | |

\* cited by examiner

SYSTEM AND METHOD FOR PREDICTING THERMAL-INSIGHTS OF A DATA CENTER

PRIORITY INFORMATION

This U.S. patent application claims priority under 35 U.S.C. § 119 to: India Application No. 3700/MUM/2013, filed on 25 Nov. 2013. The corresponding PCT application with application no. PCT/IN2014/000120 for this US patent application was filed on 25 Feb. 2014. The entire contents of the aforementioned application are incorporated herein by reference.

TECHNICAL FIELD

The present subject matter described herein, in general, relates to a system and method for predicting thermal-insights of a data center based on reduced order modeling techniques.

BACKGROUND

Air flow management has been given utmost importance in data center thermal and energy management. A change in the air flow pattern may alter temperature of servers deployed in the data center. Not only the change the air flow pattern might be large in magnitude but the time-scale associated with such a change might also be very small. It has been observed that, the data center often employ variable frequency devices (VFDs) on computer room air conditioners (CRACs), in order to manipulate the air flow pattern of the CRAC according to heat load demand of the servers. The frequent change in the air flow pattern make it imperative for an online monitoring and control systems to have a mechanism that will respond to the changes in the same time frame. This necessitates fast temperature and CRAC influence prediction methods. The online monitoring and control systems also need to have knowledge of interactions between the servers and corresponding CRACs, so as to provide a solution to a particular hot-spot. Further, due to high demand on the data center even the design changes need to be very quick and yet thermally stable. To implement the design changes quickly and to ensure the thermal safety of the electronic equipment, there is a need for fast temperature and CRAC influence prediction models The CFD technique has been used to model the data center and used as a base for developing the online monitoring and control systems. However, with above mentioned scenarios (such as design changes, CRAC location changes or CRACs with VFDs), the CFD method may found to be very time consuming and expensive. Also it has been observed that, many online control systems may not need the level of accuracy that a CFD model would provide. Only qualitative (instead of quantitative) knowledge of influence of CRACs on the servers/racks might also be sufficient. In such scenario, using CFD modeling turns out to be a very impractical option. This paves way for the use of reduced order models.

In order to reduce the number of CFD computations, a concept of reduced order modeling of the data center via proper orthogonal decomposition (POD) has been proposed by Samadiani and Joshi in a publication titled "Reduced order thermal modeling of data centers via proper orthogonal decomposition: a review." published in International Journal of Numerical Methods for Heat & Fluid Flow. The publication involve collecting velocity or temperature observations from snapshot or reference CFD simulations and then processing the velocity or temperature in POD framework. The knowledge of the velocity profile at a location may not provide insights into system control. Also, known information about a new airflow configuration is generally in terms of mass flow rates and not in terms of the velocity. Therefore using the velocity as a POD variable may increase the computational complexity of the problem substantially. Further, the reduced order thermal modeling based on POD method needs a finite number of CFD simulations or experimental observations in order to form the basis of the computations required in the data center thermal and energy management. It may be understood that, the level of accuracy and the computations required largely depends upon a set of snapshots or reference cases. In view of the large number of possible how configurations involved in the data center with VFD installed CRAC; it is very tough to select the set of reference cases that will provide estimation of the temperature to the desired accuracy level. Therefore, it becomes a challenge to identify exact and appropriate set of the reference cases that may provide accurate prediction of the temperature for a given airflow configuration. Moreover, it is a challenge to quantify the exact offline CFD effort required for achieving a particular level of accuracy for any given airflow configuration of the CRAC.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for real-time prediction of thermal-insights and the concepts are further described below in the detailed description. This summary is not intended to identify essential features of the claimed subject matter nor is it intended for use in determining or limiting the scope of the claimed subject matter.

In one implementation, a system for real-time prediction of thermal-insights for a heat dissipating device in a data center cooled by one or more cooling units is disclosed. The system comprises a processor and a memory coupled to the processor for executing a plurality of modules present in the memory. The plurality of modules comprises a statistical model generation module, a first reference scenario generation module, a test scenario generation module, a second reference scenario module, a Proper Orthogonal Decomposition (POD) module, an error computation module, and a thermal prediction module. The statistical model generation module may be configured to receive data and a set of operational parameters, wherein the data may be associated to the data center, and wherein the set of operational parameters may be associated to at least one of the cooling units or the one or more heat dissipating devices. The statistical model generation module may be further configured to generate a statistical model, wherein the statistical model may be generated based on partitioning of search space into a plurality of cells, and wherein the search space may be defined by the set of operational parameters. The first reference scenario generation module may be configured to generate a first set of reference scenarios by selecting a set of refinement indices for the statistical model, wherein the set of refinement indices may be associated with local sub-partitioning of the plurality of cells. The first reference scenario generation module may further be configured to compute a first set of REFERENCE influence mass fraction metrics (IMFM) for the first set of reference scenarios, wherein the first set of REFERENCE IMFM may be computed by performing computational fluid dynamics (CFD) simulation for the first set of reference scenarios. The test scenario generation module may be configured to generate a first set of test scenarios, wherein the first set of test scenarios may comprise at least one test scenario from each cell of the search space, and wherein each test scenario of the first set of test scenarios may comprise at least one operational parameter bounded by the set of operational parameters. The test scenario generation module may further be configured to compute a first set of TEST IMFM for the first set of test scenarios, wherein the first set of TEST IMFM may be computed by performing computational fluid dynamics (CFD) simulation on the first set of test scenarios. The second reference scenario generation module may be configured to select a second set of reference scenarios for each test scenario of the first set of test scenarios based on the each test scenario and the cell bounding the each test scenario. The second reference scenario generation module may further be configured to select a second set of REFERENCE IMFM from the first set of REFERENCE IMFM, wherein the second set of REFERENCE IMFM may be associated to the second set of reference scenarios. The Proper Orthogonal Decomposition (POD) module may be configured to compute a first set of NEW IMFM for the first set of test scenarios by performing Proper Orthogonal Decomposition (POD) computation using the second set of REFERENCE IMFM and at least one test operational parameter for the each test scenario of the first set of test scenarios, wherein the at least one test operational parameter may be bounded by the set of operational parameters. The error computation module may be configured to compute a set of errors by comparing the first set of NEW IMFM with the first set of TEST IMFM, wherein each error of the set of errors may correspond to a test scenario or a group of test scenarios belonging to a cell of the first set of test scenarios. The error computation module may further be configured to identify a subset of the first set of test scenarios having an error greater than a pre-defined threshold value. The error computation module may further be configured to identify at least one cell of the plurality of cells associated with the subset of the first set of reference scenarios. In one embodiment, the error computation module may further be configured to iteratively perform the steps performed by the first reference scenario generation module, the test scenario generation module, the second reference scenario generation module, the POD module and the error computation module. In one aspect, the error computation module may iteratively perform the steps based on the at least one cell in order to generate a modified first set of reference scenarios by selecting a modified set of refinement indices, compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, compute a modified set of errors, wherein the steps performed by the first reference scenario generation module, the test scenario generation module, the second reference scenario generation module, the POD module and the error computation module until the each error of the set of errors may be less than the predefined threshold value. The thermal prediction module may be configured to receive a second set of test scenarios. The thermal prediction module may further be configured to compute a second set of NEW IMFM for the second set of test scenarios by performing the POD computation using the at least one test operational parameter for each of the test scenarios of the second set of test scenarios and one of the second set of REFERENCE IMFM or the modified second set of REFERENCE IMFM. The thermal prediction module may further be configured to predict the thermal-insights for the heat dissipating device based upon the second set of NEW IMFM and the data.

In another implementation, a method for real-time prediction of thermal-insights for a heat dissipating device in a data center cooled by one or more cooling units is disclosed. The method comprising (a) receiving data and a set of operational parameters, wherein the data is associated to the data center, and wherein the set of operational parameters is associated to at least one of the cooling units or the one or more heat dissipating devices; (b) generating a statistical model, wherein the statistical model is generated based on partitioning of search space into a plurality of cells, and wherein the search space is defined by the set of operational parameters; (c) generating a first set of reference scenarios by selecting a set of refinement indices for the statistical model, wherein the set of refinement indices is associated with local sub-partitioning of the plurality of cells; (d) computing a first set of REFERENCE influence mass fraction metrics (IMFM) for the first set of reference scenarios, wherein the first set of REFERENCE IMFM is computed by performing computational fluid dynamics (CFD) simulation for the first set of reference scenarios; (e) generating a first set of test scenarios, wherein the first set of test scenarios comprises at least one test scenario from each cell of the search space, and wherein each test scenario of the first set of test scenarios comprises of at least one operational parameter bounded by the set of operational parameters; (f) computing a first set of TEST IMFM for the first set of test scenarios, wherein the first set of TEST IMFM is computed by performing computational fluid dynamics (CFD) simulation on the first set of test scenarios; (g) selecting a second set of reference scenarios for each test scenario of the first set of test scenarios based on the each test scenario and the cell bounding the each test scenario; (h) selecting a second set of REFERENCE IMFM from the first set of REFERENCE IMFM, wherein the second set of REFERENCE IMFM is associated to the second set of reference scenarios; (i) computing a first set of NEW IMFM for the first set of test scenarios by performing Proper Orthogonal Decomposition (POD) computation using the second set of REFERENCE IMFM and at least one test operational parameter for the each test scenario of the first set of test scenarios, wherein the at least one test operational parameter is bounded by the set of operational parameters; (j) computing a set of errors by comparing the first set of NEW IMFM with the first set of TEST IMFM, wherein each error of the set of errors corresponds to a test scenario or group of test scenarios of the first set of test scenarios; (k) identifying a subset of the first set of test scenarios having an error greater than a pre-defined threshold value; (l) identifying at least one cell of the plurality of cells associated with the subset of the first set of reference scenarios; (m) iteratively performing the steps of (c), (d), (e), (f), (g), (h), (i), (j), (k), (l) and (m) based on the at least one cell in order to: generate a modified first set of reference scenarios by selecting a modified set of refinement indices; compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, compute a modified set of errors, wherein the steps of (c), (d), (e), (f), (g), (h), (i), (j), (k), (l) and (m) are iteratively performed until the each error of the set of errors is less than the predefined threshold value; (n) receiving a second set of test scenarios; (o) computing a second set of NEW IMFM for the second set of test scenarios by performing the POD computation using the at least one test operational parameter for each of the test scenarios of the second set of test scenarios and one of the second set of REFERENCE IMFM or the modified second set of REFERENCE IMFM; and (p) predicting the thermal-insights for the heat dissipating device based upon the second set of NEW IMFM and the data. In one aspect, the aforementioned method may be implemented by a processor using instructions stored in a memory.

In yet another implementation, a non transitory computer program product having embodied thereon a computer program for real-time prediction of thermal-insights for a heat dissipating device in a data center cooled by one or more cooling units. The computer program product may comprise instructions for (a) receiving data and a set of operational parameters, wherein the data is associated to the data center, and wherein the set of operational parameters is associated to at least one of the cooling units or the one or more heat dissipating devices; (b) generating a statistical model, wherein the statistical model is generated based on partitioning of search space into a plurality of cells, and wherein the search space is defined by the set of operational parameters; (c) generating a first set of reference scenarios by selecting a set of refinement indices for the statistical model, wherein the set of refinement indices is associated with local sub-partitioning of the plurality of cells; (d) computing a first set of REFERENCE influence mass fraction metrics (IMFM) for the first set of reference scenarios, wherein the first set of REFERENCE IMFM is computed by performing computational fluid dynamics (CFD) simulation for the first set of reference scenarios; (e) generating a first set of test scenarios, wherein the first set of test scenarios comprises at least one test scenario from each cell of the search space, and wherein each test scenario of the first set of test scenarios comprises of at least one operational parameter bounded by the set of operational parameters; (f) computing a first set of TEST IMFM for the first set of test scenarios, wherein the first set of TEST IMFM is computed by performing computational fluid dynamics (CFD) simulation on the first set of test scenarios; (g) selecting a second set of reference scenarios for each test scenario of the first set of test scenarios based on the each test scenario and the cell bounding the each test scenario; (h) selecting a second set of REFERENCE IMFM from the first set of REFERENCE IMFM, wherein the second set of REFERENCE IMFM is associated to the second set of reference scenarios; (i) computing a first set of NEW IMFM for the first set of test scenarios by performing Proper Orthogonal Decomposition (POD) computation using the second set of REFERENCE IMFM and at least one test operational parameter for the each test scenario of the first set of test scenarios, wherein the at least one test operational parameter is bounded by the set of operational parameters; (j) computing a set of errors by comparing the first set of NEW IMFM with the first set of TEST IMFM, wherein each error of the set of errors corresponds to a test scenario or group of test scenarios of the first set of test scenarios; (k) identifying a subset of the first set of test scenarios having an error greater than a pre-defined threshold value; (l) identifying at least one cell of the plurality of cells associated with the subset of the first set of reference scenarios; (m) iteratively performing the steps of (c), (d), (e), (f), (g), (h), (i), (j), (k), (l) and (m) based on the at least one cell in order to: generate a modified first set of reference scenarios by selecting a modified set of refinement indices; compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, compute a modified set of errors, wherein the steps of (c), (d), (e), (f), (g), (h), (i), (j), (k), (l) and (m) are iteratively performed until the each error of the set of errors is less than the predefined threshold value; (n) receiving a second set of test scenarios; (o) computing a second set of NEW IMFM for the second set of test scenarios by performing the POD computation using the at least one test operational parameter for each of the test scenarios of the second set of test scenarios and one of the second set of REFERENCE IMFM or the modified second set of REFERENCE IMFM; and (p) predicting the thermal-insights for the heat dissipating device based upon the second set of NEW IMFM and the data.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
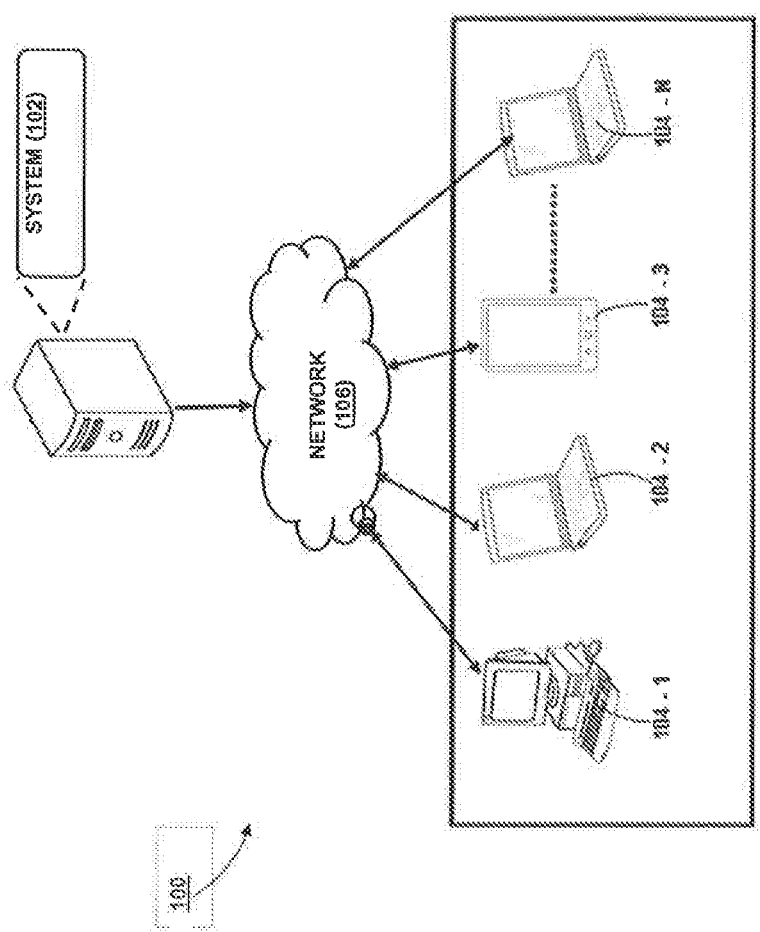
FIG. 1 illustrates a network implementation of a system real-time prediction of thermal-insights for a heat dissipating device in a data center cooled by one or more cooling units, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

In order to predict thermal-insights for the heat dissipating device in the data center, the present subject matter may perform POD computation based on a methodology/technique proposed by Samadiani and Joshi in a publication titled "Reduced order thermal modeling of data centers via proper orthogonal decomposition: a review." published in International Journal of Numerical Methods for Heat & Fluid Flow hereinafter referred to as a reference. However a modified version of the methodology may be used by implementing a concept of using influence mass fractions as POD variable instead of velocity or temperature. The use of influence mass fractions as the variable may simplify the POD computations and also provides insights into system control by quantifying the influence of system sources like CRACs on the system targets like server inlets. The methodology/technique may comprise an identification of design parameters of the system that may comprise CRAC supply flow rates and the variable, distribution that needs to be estimated. It may be understood that, the design parameters of the system may be varied 'n' number of times in order to create system snapshots comprising of a set of variables whose distribution may be estimated for various new design parameter combinations. In one embodiment, the set of n design parameters is herein referred to as reference scenarios and the new design parameter combinations for which the variable distribution is to be estimated are herein referred to as test scenarios. It may be understood that, a scenario in general may be defined by given set of operational mass flow rates of the cooling units or the heat dissipating devices. In one aspect, the set of variables may be subjected to a specific numerical operation in order to get POD modes. Further, a POD coefficient may be calculated for new test cases by assuming that the new unknown distribution of that variable may be represented by a linear combination of the POD modes. The technique called flux matching is described by Samadiani and Joshi in a publication titled "Reduced order thermal modeling of data centers via proper orthogonal decomposition: a review." published in International Journal of Numerical Methods for Heat & Fluid Flow. The flux matching, in one embodiment, may be implemented in terms of influence mass fractions instead of velocity. The POD coefficients may then be used to compute the distribution of the variable for the new test scenario. In one embodiment, the methodology/technique used in this approach may cater to the data center having variable flow CRACs (VFD controlled CRACs in other words) and electronic racks with considerable variations in intake mass flow rates (due to continuous changing server or chassis fan flow). The method described further provides the means to predict the thermal insights quickly even for a variable flow CRAC and frequent changes in rack flow rates based on the plurality of modules as described below.

The present subject matter discloses an effective and efficient mechanism for prediction of thermal-insights for a heat dissipating device in a data center cooled by one or more cooling units hereinafter referred to as a cooling unit. In one embodiment, the thermal-insights may comprise mass flow rate, a temperature, and insights into thermal influence of air sources on the heat dissipating device. The present subject matter facilitates to provide quick and accurate information about the cooling unit having maximum influence on the heat dissipating device for any scenario in the data center. It may be understood that, the cooling unit may be employed with variable frequency drive (VFD) that may alter the supply air flow according to the heat load demand on the heat dissipating devices. Examples of the heat dissipating device may include a server, a computer, a rack housing the server, and a combination thereof. Examples of the cooling unit may include a computer room air conditioner (CRAC).

In order to predict the thermal-insights of the data center in real-time, some offline activities may be performed. First, data and a set of operational parameters may be received. It may be understood that, the data may be associated to the data center. Example of the set of the data may include, geometrical information of the data center, configuration data associated to the heat dissipating device, data associated to the cooling unit and data required for creating a computational fluid dynamics simulation of the datacenter. The set of operational parameters, on the other hand, may be associated to the cooling unit or the heat dissipating device. Example of the set of operational parameters may include, but not limited to, a minimum operational mass flow rate of the cooling unit or the heat dissipating device and a maximum operational mass flow of the cooling unit or the heat dissipating device.

Based on the data and the set of operational parameters, a statistical model may be generated. In one embodiment, the statistical model may be a multi-dimension space. It may be understood that, the statistical model may comprise a plurality of cells, wherein each cell of the statistical model may represent a search space. It may be understood that, the search space may be defined by the set of operational parameters. Upon generating the statistical model, a first set of reference scenarios may be generated to compute a first set of REFERENCE influence mass fraction metrics (IMFM). It may be understood that, the first set of REFERENCE IMFM may be computed by performing computational fluid dynamics (CFD) simulation for the first set of reference scenarios. After computing the first set of REFERENCE IMFM, a first set of test scenarios may be generated. It may be understood that, a first set of TEST IMFM may be computed by performing computational fluid dynamics (CFD) simulation on the first set of test scenarios.

Subsequent to the computation of the first set of TEST IMFM for the first set of test scenarios, a second set of reference scenarios may be selected. It may be understood that, the second set of reference scenarios may be selected from the first test scenarios based on each test scenario and cell bounding the each test scenario of the first set of test scenarios. After selecting the second set of reference scenarios, a second set of REFERENCE IMFM may be selected from the first set of REFERENCE IMFM. It may be understood that, the second set of REFERENCE IMFM may be associated to the second set of reference scenarios. It may be understood that, the second set of reference scenarios is a subset of the first set of reference scenarios, and wherein the second set of REFERENCE IMFM is a subset of the first set of REFERENCE IMFM.

In one embodiment, the present subject matter further computes a first set of NEW IMFM for the first set of test scenarios. It may be understood that, the first set of NEW IMFM may be computed by performing Proper Orthogonal Decomposition (POD) computation using the second set of REFERENCE IMFM and an operational parameter for the each test scenario of the first set of test scenarios. After computing the first set of NEW IMFM, a set of errors may be computed by comparing the first set of NEW IMFM with the first set of TEST IMFM.

In one embodiment, when an error corresponding to a subset of the first set of test scenarios is greater than a pre-defined threshold value, a cell of the plurality of cells may be identified corresponding to the subset of the first set of reference scenarios. Based on the identification of the cell, the present subject matter may iteratively perform the steps as aforementioned until the error associated to that test scenario or set of test scenarios belonging to a cell is less than the predefined threshold value. It may be understood that, upon iteratively performing the steps, a modified set of first set of reference scenarios, a modified first set of REFERENCE influence mass fraction metrics (IMFM), a modified first set of test scenarios, a modified first set of test IMFM, a modified second set of reference scenarios, a modified second set of REFERENCE IMFM, a modified first set of NEW IMFM and a modified set of errors may be determined.

In one embodiment, all the aforementioned tasks may be performed in an offline manner. Further, when the error corresponding to the subset of the first set of test scenarios is less than the pre-defined threshold value, a second set of test scenarios may be received in real-time. It may be understood, that the second set of test scenarios may be received from a user. After receiving the second set of test scenarios, a second set of NEW IMFM may be computed, in real time, for the second set of test scenarios and one of the second set of REFERENCE IMFM or the modified second set of REFERENCE IMFM in order to predict the thermal-insights for the heat dissipating device.

It may be understood that, the first set of REFERENCE influence mass fraction metrics (IMFM), the first set of TEST IMFM, the second set of REFERENCE IMFM, the first set of NEW IMFM, the modified first set of REFERENCE (IMFM), the modified second set of REFERENCE IMFM, the modified first set of NEW IMFM and the second set of NEW IMFM is indicative of influence of the cooling unit and the heat dissipating device on the heat dissipating device. Further it may be understood that, the first set of REFERENCE influence mass fraction metrics (IMFM), the first set of TEST IMFM, the second set of REFERENCE IMFM, the modified first set of REFERENCE IMFM, and the modified second set of REFERENCE IMFM are derived from influence index metrics obtained through CFD analysis of the data center as disclosed in U.S. application Ser. No. 13/234,763 (now U.S. Pat. No. 8,949,091).

While aspects of described system and method for real-time prediction of the thermal-insights for the heat dissipating device in the data center may be implemented in any number of different computing systems, environments, and/or configurations, the embodiments are described in the context of the following exemplary system.

Referring now to FIG. 1, a network implementation 100 of a system 102 for real-time prediction of thermal-insights for a heat dissipating device in a data center cooled by one or more cooling units is illustrated, in accordance with an embodiment of the present subject matter. In one embodiment, the system 102 may receive data and a set of operational parameters, wherein the data is associated to the data center, and wherein the set of operational parameters is associated to at least one of the cooling units or the one or more heat dissipating devices. After receiving the data and the set of operational parameters, the system 102 may generate a statistical model. Subsequent to the generation of the statistical model, the system 102 may generate a first set of reference scenarios. After generating the first set of reference scenarios, the system 102 may compute a first set of REFERENCE influence mass fraction metrics (IMFM) for the first set of reference scenarios. The system 102 may further generate a first set of test scenarios. Subsequent to the generation of the first set of test scenarios, the system 102 may further compute a first set of TEST IMFM for the first set of test scenarios. The system 102 may further select a second set of reference scenarios from the first set of reference scenarios. After selecting the second set of reference scenarios, the system 102 may select a second set of REFERENCE IMFM from the first set of REFERENCE IMFM. The system 102 may further compute a first set of NEW IMFM for the first set of test scenarios. Based on the first set of NEW IMFM, the system 102 may further compute a set of errors by comparing the first set of NEW IMFM with the first set of TEST IMFM. It may be understood that, each error of the set of errors corresponds to a test scenario of the first set of test scenarios. In one embodiment, when a subset of the first set of test scenarios is having an error greater than a pre-defined threshold value, the system 102 may identify a cell associated with the subset of the first set of reference scenarios. Upon identifying the cell, the system 102 may iteratively perform the steps of generation of the first set of reference scenarios, computation of the first set of REFERENCE IMFM, generation of the first set of test scenarios, computation of the first set of TEST IMFM, selection of the second set of reference scenarios for each test scenario of the first set of test scenarios, selection of the second set of REFERENCE IMFM, computation of the first set of NEW IMFM, computation of the set of errors, identification of the subset of the first set of test scenarios, identification of at least one cell of the plurality of cells. It may be understood that the system 102 iteratively perform the aforementioned steps to generate a modified first set of reference scenarios, compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, compute a modified set of errors, until the error is less than the predefined threshold value. In one embodiment, receiving of the data and the set of operational parameters, generation of the statistical model, generation of the first set of reference scenarios, computation of the first set of REFERENCE influence mass fraction metrics (IMFM), generation of the first set of test scenarios, computation of the first set of TEST IMFM, selection of the second set of reference scenarios, selection of the second set of REFERENCE IMFM, computation of the first set of NEW IMFM, computation of the set of errors, identification of the subset of the first set of test scenarios, identification of the at least one cell of the plurality of cells and iteratively performing the aforementioned steps until the each error of the set of errors is less than the predefined threshold value, may be performed in an offline manner. The system 102 may further receive, in real time, a second set of test scenarios. After receiving the second set of test scenarios, the system 102 may compute, in real time, a second set of NEW IMFM for the second set of test scenarios in order to predict the thermal-insights for the heat dissipating device.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
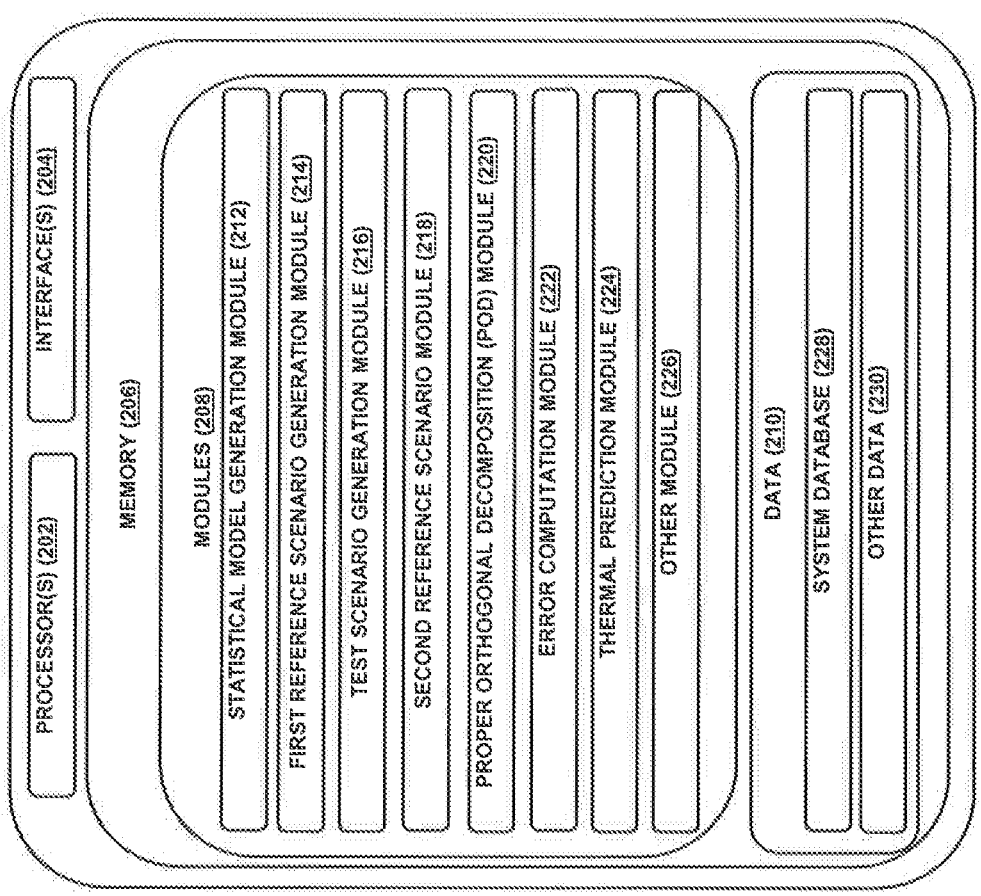
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a statistical model generation module 212, a first reference scenario generation module 214, a test scenario generation module 216, a second reference scenario generation module 218, a Proper Orthogonal Decomposition (POD) module 220, an error computation module 222, a thermal prediction module 224 and other module 226. The other module 226 may include programs or coded instructions that supplement applications and functions of the system 102.

The data 210, amongst other things, serves as a repository for storing data processed, received, and generated by one or more of the modules 208. The data 210 may also include a system database 228 and other data 230. The other data 230 may include data generated as a result of the execution of one or more modules in the other module 226.

In one implementation, at first, a user may use one of the user devices 104 to access the system 102 via the I/O interface 204. The users may register themselves using the I/O interface 204 in order to use the system 102. In one aspect, the user may accesses the I/O interface 204 of the system 102 for real-time prediction of thermal-insights for a heat dissipating device in a data center cooled by one or more cooling units hereinafter referred to as cooling units. Examples of the thermal-insights may include, but not limited to, a mass flow rate, a temperature, and insights (qualitative/quantitative) into thermal influence of air sources on the heat dissipating device. Examples of the heat dissipating devices may include, but not limited to, a server, a computer, and a rack housing the server. Examples of the cooling unit may include, but not limited to, a computer room air conditioner (CRAC). In order to predict the thermal-insights for the heat dissipating device in the data center, the system 102 may employ the statistical model generation module 212, the first reference scenario generation module. 214, the test scenario generation module 216, the second reference scenario generation module 218, the Proper Orthogonal Decomposition (POD) module 220, the error computation module 222, and the thermal prediction module 224. The detailed working of the plurality of modules is described below.

Statistical Model Generation Module 212

Referring to FIG. 2, a detailed working of the statistical model generation module 212 along with the working of other components of the system 102 is illustrated, in accordance with an embodiment of the present subject matter. In one implementation, the statistical model generation module 212 may, at first, receive data and a set of operational parameters. The data may be associated to the data center whereas the set of operational parameters may be associated to at least one of the cooling units or the heat dissipating devices. Examples of the cooling units may include a cooling unit is a computer room air conditioner (CRAC), whereas the examples of the heat dissipating device may include a server, a computer, a rack housing the server.

In one embodiment, the data and the set of operational parameters may either received from a user or at least one data source. Examples of the data may include geometrical information of the data center, configuration data associated to the heat dissipating device, data associated to the cooling unit and data required for creating a computational fluid dynamics simulation of the data center. Examples of the set of operational parameters may include minimum supply flow rate/operational mass flow rate of the cooling unit/the heat dissipating device respectively and a maximum supply flow rate/operational mass flow of the cooling unit/the heat dissipating device respectively. In one aspect, the minimum operational supply flow rate and the maximum operational supply flow rate of the cooling unit may be specified in an operating manual of the cooling unit. Similarly, the minimum operational mass flow rate and the maximum operational mass flow rate of the heat dissipating devices, such as the server or server chassis fan, may be specified in the operating manual of the heat dissipating devices.

Figure 3A:
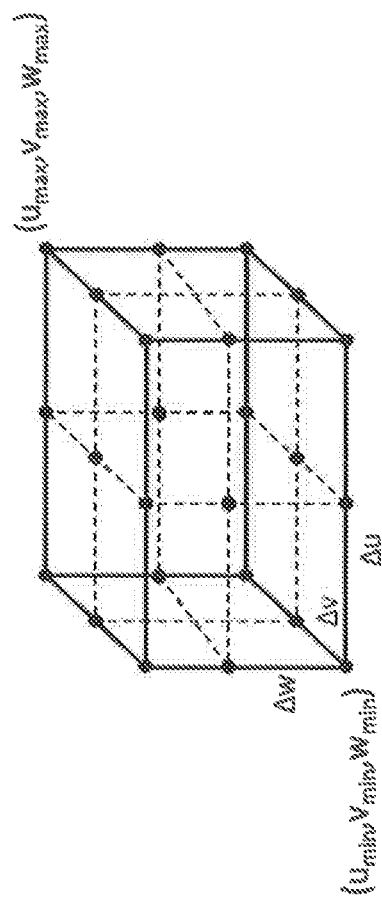
FIG. 3(a), 3(b), 4 and 5 are working examples of the system, in accordance with one or more embodiments of the present subject matter

Subsequent to the receiving of the data and the set of operational parameters, the statistical model generation module 212 may further generate a statistical model. The statistical model may be generated based on partitioning of search space into a plurality of cells, wherein any point inside the cell or the search space represents a data center scenario. It may be understood that, the search space may be defined by the set of operational parameters. In one aspect, the dimension of the search space may be determined based on number of the cooling units or the heat dissipating devices that exhibit variable air flow in operation. In an example, consider a test data center cooled by 3 CRACs i.e. CRAC 1, CRAC 2 and CRAC 3, as the cooling units, having a minimum supply flow rate of $U_{min}$, $V_{min}$ and $W_{min}$ respectively and a maximum supply flow rate of $U_{max}$, $V_{max}$ and $W_{max}$ FIG. 3 (a) shows the search space generated for the 3 CRAC data center by the statistical model generation module 212. Since the search space is impacted by the 3 CRACs, therefore the search space may comprise a three dimensional structure such as cuboid. It may be understood that, each side of the cuboid represents the operational range of supply flow rates of each of the 3 CRACs. Therefore, the coordinates of a point in the cuboid represent a scenario with its CRAC flow rates. It may be understood that, virtually any point inside the cuboid represents a unique scenario of the CRAC flow rates. It may be understood that, the nodes of the cuboid represent limiting cases of various possible CRAC flow rate scenarios. Similarly, it may be understood that, if the search space is impacted by 'n' CRACs/heat dissipating devices the search space may comprise an n-dimensional structure. The statistical model helps in building a robust model for identifying the reference scenarios to be considered for POD calculations related to any given test scenario. It may be understood that statistical model generation module 212 may perform the tasks as described above in an offline manner.

First Reference Scenario Generation Module 214

After generating the statistical model based on the minimum supply flow rate and the maximum supply flow rate, the first reference scenario generation module 214 may generate a first set of reference scenarios. The first set of reference scenarios may be generated by selecting a set of refinement indices for the statistical model. It may be understood that, the set of refinement indices may be associated with local sub-partitioning of the plurality of cells of the search space. It may be understood that, the nodal scenarios of a given cell may be required for a POD computation for a test scenario lying inside that cell. Therefore nodal scenarios of the all the partitioned cells in the search space represented by highlighted dots in FIG. 3(a), may be considered to be the first set of reference scenarios. After generating the first set of reference scenarios, the first reference scenario generation module 214 may further compute a first set of REFERENCE influence mass fraction metrics (IMFM), hereinafter referred as the first set of REFERENCE IMFM, for the first set of reference scenarios. In one embodiment, the first set of REFERENCE IMFM may be computed by performing computational fluid dynamics (CFD) simulation for the first set of reference scenarios. Further, it may be noted that the first set of REFERENCE influence mass fraction metrics (IMFM) for the first set of reference scenarios may be obtained based on a methodology/technique disclosed in U.S. application Ser. No. 13/234,763 (now U.S. Pat. No. 8,949,091), hereinafter incorporated by reference. In one embodiment, the reference generally describes influence index metrics that indicate the influence of CRACs and heat dissipative devices on each of the heat dissipating device in the data center. It may be understood that the first reference scenario generation module 214 may perform the tasks as described above in an offline manner.

Test Scenario Generation Module 216

Figure 3B:
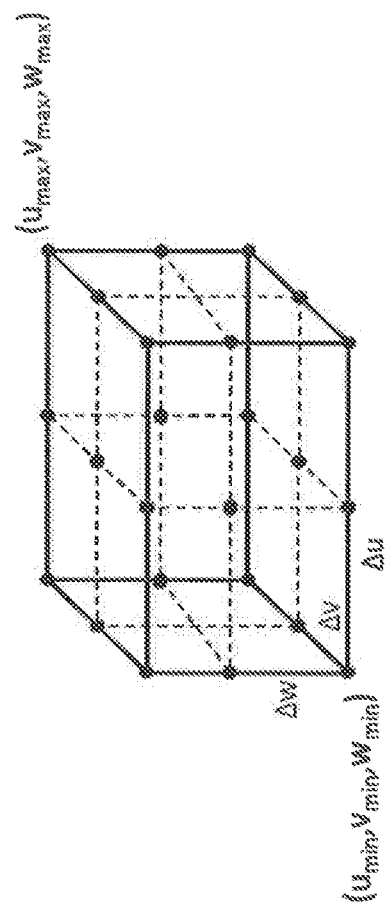

Subsequent to the computation of the first set of REFERENCE IMFM, the test scenario generation module 216 may generate a first set of test scenarios. It may be understood that, the first set of test scenarios may comprise at least one test scenario from each cell of the search space. Now, in order to understand a working of the test scenario generation module 216, let us consider the example, as aforementioned, the test data center being cooled by 3 CRACs i.e. CRAC 1, CRAC 2 and CRAC 3 having a minimum supply flow rate of $U_{min}$, $V_{min}$ and $W_{min}$ respectively and a maximum supply flow rate of $U_{max}$, $V_{max}$ and $W_{max}$ as shown in the FIG. 3 (a). Since the search space is impacted by the 3 CRACs, therefore the search space may comprise a three dimensional structure such as cuboid. In one aspect, the cuboid is sub-partitioned into 8 sub-cells as shown in FIG. 3(b). In one embodiment, the cuboid may be sub-partitioned into the 8 sub-cells i.e. SC1 to SC8. It may be understood that, each sub-cell of the cuboid (SC1 to SC8) may comprise at least one test scenario that is represented by T1-T8 in the FIG. 3(b), wherein the at least one test scenario may comprise of at least one operational parameter bounded by the set of operational parameters. It may be understood that, the at least one operational parameter may be a supply flow rate bounded by the limits of the minimum supply flow rate and the maximum supply flow rate of the cooling unit.

Based on the aforesaid description, the test scenario generation module 216 may generate the first set of test scenarios comprising the at least one test scenario for 8 sub-cells of the cuboid. In one aspect, the test scenario generation module 216 ensures that each sub-partitioned cell with its nodal points as reference scenarios for the enclosed test scenario may get an accuracy check that may be carried out by the plurality of modules as explained below. After generating the first set of test scenarios, the test scenario generation module 216 may further compute a first set of TEST IMFM for the first set of test scenarios. In one embodiment, the first set of TEST IMFM may be computed by performing computational fluid dynamics (CFD) simulation on the first set of test scenarios. It may be noted that the first set of TEST IMFM may be obtained based on methodologies described in U.S. application Ser. No. 13/234,763 (now U.S. Pat. No. 8,949,091). It may be understood that, the test scenario generation module 216 may perform the tasks as described above in an offline manner.

Second Reference Scenario Generation Module 218

After computing the first set of TEST IMFM, the second reference scenario generation module 218, may select a second set of reference scenarios for the each test scenario of the first set of test scenarios. It may be understood that, the second set of reference scenarios may be selected from the first set of reference scenarios. In one embodiment, the second set of reference scenarios may be selected based on the each test scenario and nodal points of the cell bounding the each test scenario. The cell may represent the search space partition bounded by a scenario, wherein the scenario may comprise the at least one operational parameter bounded by the set of operational parameters.

Figure 4:
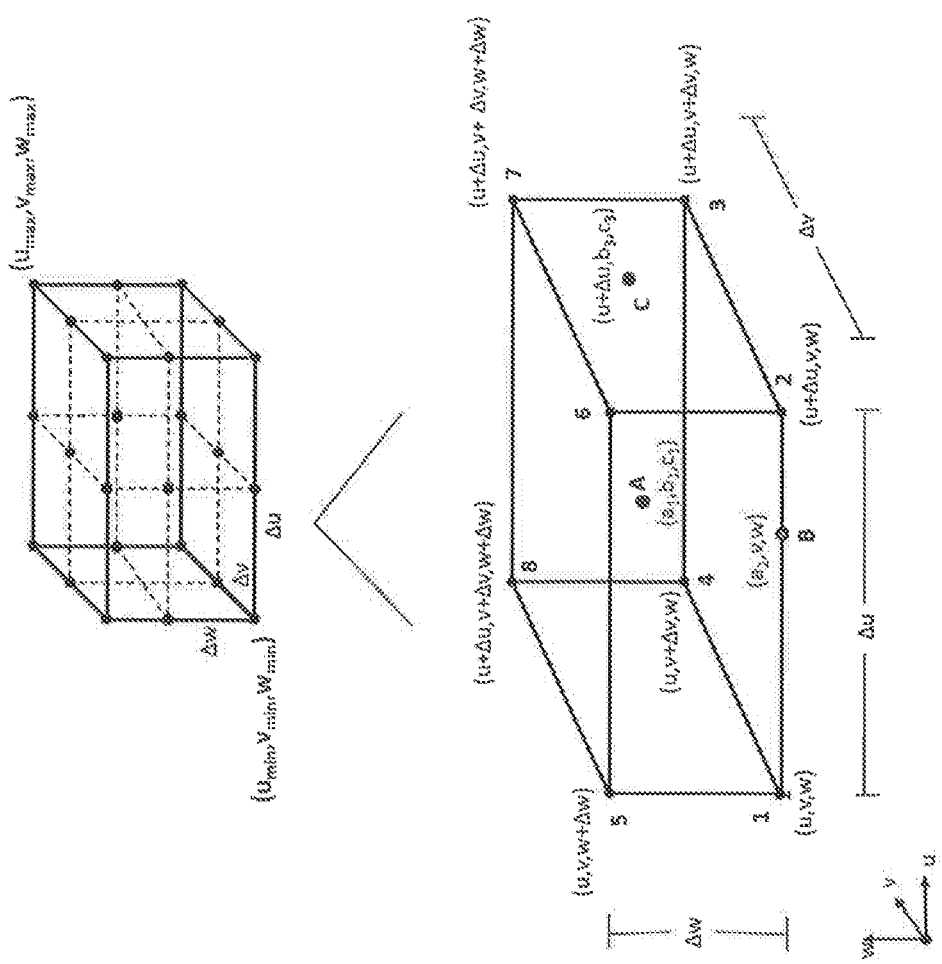

Now, in order to understand a working of the second reference scenario generation module 218, consider an example, as illustrated in FIG. 4, having nodal-points of a cuboid 402 represented by $U_{min}$, $V_{min}$, $W_{min}$ and $U_{max}$, $V_{max}$ $W_{max}$. In one aspect, the nodal points (the $U_{min}$, the $V_{min}$, the $W_{min}$ and the $U_{max}$, the $V_{max}$ the $W_{max}$) of the cuboid may be considered as a first set of reference scenarios, wherein the $U_{min}$, the $V_{min}$, the $W_{min}$ and the $U_{max}$, the $V_{max}$ the $W_{max}$ are the minimum supply flow rate and the maximum supply flow rate of 3CRACs respectively. Since the test scenario generation module 216 may generate the first set of test scenarios for each cell of the cuboid, the second reference scenario generation module 218 may select the second set of reference scenarios from the first set of reference scenarios by identifying each sub-cell of the cuboid corresponding to each test scenario of the first set of test scenarios. As shown in the FIG. 4, a sub-cell 404 of the cuboid may be identified having a test scenario of the first set of test scenarios, wherein the test scenario is represented by 'A'. Subsequent to the identification of the sub-cell 404, nodal points of the sub-cell may be selected as the second set of reference scenarios for the test scenario 'A'. Similarly, the second set of reference scenarios for a test scenario 'B' and 'C' may be selected based on the identification of the sub-cell 404 of the cuboid 402 corresponding to the test scenario 'B' and 'C'. In one aspect, the second set of reference scenarios for the 'A', 'B' and 'C' are tabulated as follows

| First set of Test Scenario | Second set of reference scenarios |
|---|---|
| A | 1-2-3-4-5-6-7-8 |
| B | 1-2 |
| C | 2-3-6-7 |

It may be understood that, since limiting cases serve as second set of reference scenarios for the first set of test scenarios, finer cuboids would provide a more accurate prediction than a coarser cuboid for a scenario point inside the cuboid. Therefore, depending upon the air flow supply range of each CRAC, the cuboid is divided into smaller sub-cuboids in order to create more limiting cases for the possible CRAC scenarios. After selecting the second set of reference scenarios, the second reference scenario generation module 218 may further select a second set of REFERENCE IMFM from the first set of REFERENCE IMFM. In one embodiment, each scenario of the second set of reference scenarios corresponding to each REFERENCE IMFM of the first set of REFERENCE IMFM may be selected by the second reference scenario generation module 218 as the second set of REFERENCE IMFM. In other words, it may be understood that the second set of REFERENCE IMFM is a subset of the first set of REFERENCE IMFM and the second set of REFERENCE IMFM is associated to the second set of reference scenarios. It may be understood that the second reference scenario generation module 218 may perform the tasks as described above in an offline manner.

Proper Orthogonal Decomposition (POD) Module 220

In one embodiment, after selecting the second set of REFERENCE IMFM from the first set of REFERENCE IMFM, the proper orthogonal decomposition (POD) module 220 may compute a first set of NEW IMFM for the first set of test scenarios generated by the first reference scenario generation module 214. It may be understood that, the first set of NEW IMFM may be computed by performing Proper Orthogonal Decomposition (POD) computation using the second set of REFERENCE IMFM and at least one test operational parameter for the each test scenario of the first set of test scenarios, wherein the at least one test operational parameter is bounded by the set of operational parameters.

Figure 5:
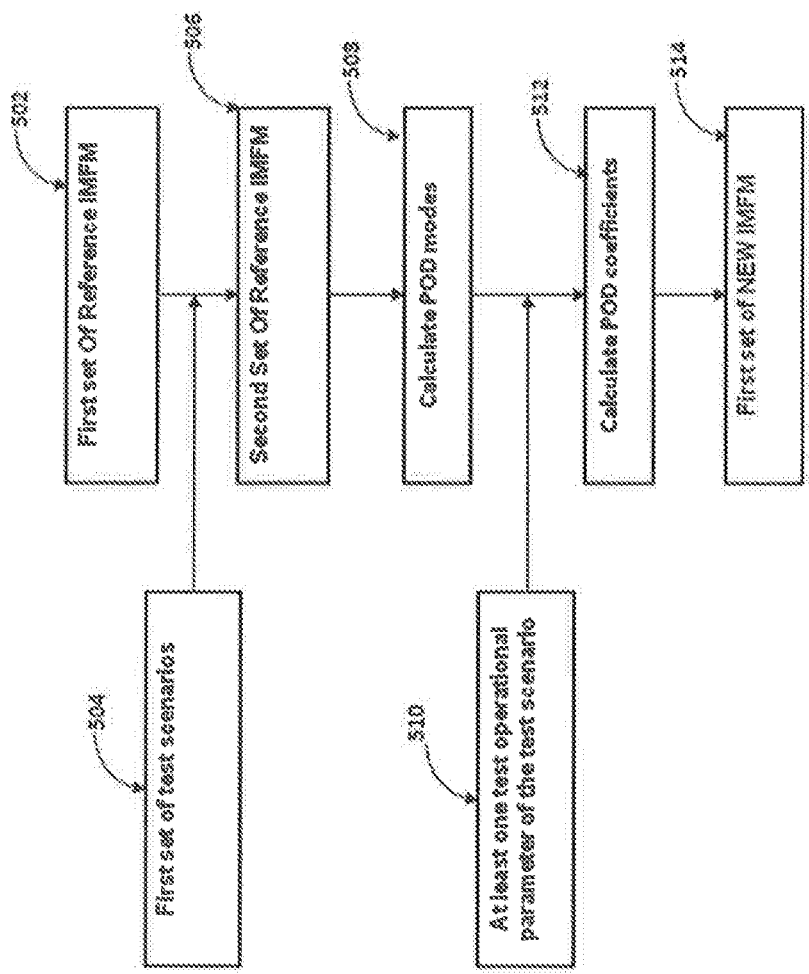

Now, in order to understand a working of the proper orthogonal decomposition (POD) module 220, consider a following example as illustrated in FIG. 5. In this example, the second set of reference IMFM (at block 506) may be selected from the first set of reference IMFM (at block 502) based on the first set of test scenarios (at block 504). The second set of reference IMFM (at block 506) may be analyzed to calculate POD mode (at block 508). It may be understood that, the POD mode (at block 508) may be calculated by numerically processing reference data that may comprise the second set of reference IMFM (at block 506). In one aspect, the reference data may be determined based on CFD simulations. Subsequent to the calculation of the POD mode (at block 508), at least one test operational parameter of the test scenario (at block 510) and the POD mode (at block 508) may further be analyzed to calculate POD coefficients (at block 512). Based on the calculation of the POD coefficients (at block 512) and the POD mode (at block 508), a first set of NEW IMFM (at block 514) may be determined.

It may be noted that the POD computation may be performed based on a methodology/technique proposed by Samadiani and Joshi in a publication titled "Reduced order thermal modeling of data centers via proper orthogonal decomposition: a review." published in International Journal of Numerical Methods for Heat & Fluid Flow, hereinafter incorporated as another reference. It may be understood that, the POD computation, as described in the above cited reference, is performed to collect input in terms of temperature or velocity that may be complex to process for further prediction of thermal insights. However the present subject matter uses influence mass fractions as a POD variable, wherein influence mass fractions are based on the concept of thermal influence index metrics as disclosed in U.S. application Ser. No. 13/234,763 (now U.S. Pat. No. 8,949,091). In one aspect, the influence mass fractions may represent the influence of the cooling units on the one or more heat dissipating devices in terms of air flow. The influence mass fractions may be obtained from CFD simulation of the data center. The use of influence mass fractions as POD variable may enable to obtain thermal insights of the heat dissipating devices based on the data and the predicted set of NEW IMFM. It may be understood that the proper orthogonal decomposition (POD) module 220 may perform the tasks as described above in an offline manner.

Error Computation Module 222

Based on the computation of the first set of NEW IMFM, the error computation module 222 may compute a set of errors by comparing the first set of NEW IMFM with the first set of TEST IMFM computed by the test scenario generation module 216. It may be understood that, each error of the set of errors may correspond to a test scenario of the first set of test scenarios, and wherein the test scenario may be associated a cell of the plurality of cells. In one embodiment, the cell may comprise one or more test scenarios from the first set of test scenarios. Each test scenarios of the one or more test scenarios from first set of test scenarios may be associated to one or more errors. In order to compute an error associated to the cell, the error computation module 222 may compute a mean/average of the one or more errors corresponding to the one or more test scenarios belonging to the cell. In this manner, the error computation module 222 may compute the set of errors corresponding to each group of test scenarios belonging to each cell of the search space.

Subsequent to the computation of the set of errors, the error computation module 222 may further compare each error of the set of errors associated to the test scenario of the first set of test scenarios with a pre-defined threshold value stored in the system database 228. Based on the comparison, the error computation module 222 may further identify a subset of the first set of test scenarios, wherein the subset may comprise the each test scenario of the first set of test scenarios having an error greater than the pre-defined threshold value.

Subsequent to the identification of the subset, the error computation module 222 may further identify at least one cell of the plurality of cells in the search space of the statistical model. It may be understood that, the at least one cell may be associated with the subset of the first set of reference scenarios. In one embodiment, the at least one cell may be identified in order to iteratively execute the steps, as described above, performed by the first reference scenario generation module 214, the test scenario generation module 216, the second reference scenario generation module 218, the Proper Orthogonal Decomposition (POD) module 220 and the error computation module 222 on the cell identified. In one aspect, the steps may be iteratively performed for the identified cell to generate a modified first set of reference scenarios by selecting a modified set of refinement indices, compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, and compute a modified set of errors. It may be understood that, the steps may be iteratively performed until the error associated to each scenario of the subset is less than the predefined threshold value. Once all the errors associated to each test scenario of the first set of test scenario or the modified first set of test scenarios is less than the predefined threshold value; the total number of cells in the statistical model may be fixed. In this manner, the number of reference scenarios in the first set of reference scenarios or the modified first set of reference scenarios maybe finalized. Subsequently, the second set of reference scenarios or the modified second set of reference scenarios associated to each cell is also fixed. It may be understood that, the first set of reference scenarios or the modified first set of reference scenarios, the second set of reference scenarios or the modified second set of reference scenarios may be stored in the system database 228 for future analysis.

It may be understood that, the aforementioned tasks performed by the statistical model generation module 212, the first reference scenario generation module 214, the test scenario generation module 216, the second reference scenario generation module 218, the Proper Orthogonal Decomposition (POD) module 220, and the error computation module 222, when the system 102 is in offline mode. In one embodiment, the first set of reference scenarios or the modified first set of reference scenarios, the second set of reference scenarios or the modified second set of reference scenarios may be used for further computations by the system 102 in real time.

Thermal Prediction Module 224

In one embodiment, when the each scenario of the subset of the first set of test scenarios having the error less than a pre-defined threshold value, all sets of reference scenarios as well as REFERENCE IMFM are stored in the system database 228. Then the thermal prediction module 224 may receive, in real time, a second set of test scenarios. It may be understood that, the second set of test scenarios are those scenarios for which the real-time prediction of the thermal-insights for the heat dissipating device in the data center may be performed.

After receiving the second set of test scenarios, the thermal prediction module 224 may compute, in real time, a second set of NEW IMFM for the second set of test scenarios selected by the second reference scenario generation module 218. Each scenario of the second set of test scenarios may be located in the appropriate cell of the search space based on at least one operational parameter associated to it. The second set of reference scenarios and subsequent second set of REFERENCE IMFM for the second set of test scenarios may be selected from the system database 228 based on the nodal points of the cell it is associated with. The second set of NEW IMFM may be computed by performing the POD computation using the at least one test operational parameter for each of the test scenarios of the second set of test scenarios and one of the second set of REFERENCE IMFM selected from the system database 228. After computing the second set of NEW IMFM, the thermal prediction module 224 may be able to predict in real-time the thermal-insights for the heat dissipating device based upon the second set of NEW IMFM and the data. The thermal insights may include a mass flow rate, a temperature, and insights (qualitative/quantitative) into thermal influence of air sources on the heat dissipating device. The prediction of the thermal insights based on the IMFM and the data has been described in U.S. application Ser. No. 13/234,763 (now U.S. Pat. No. 8,949,091), incorporated herein by reference.

It may be understood that, the first set of REFERENCE influence mass fraction metrics (IMFM), the first set of TEST IMFM, the second set of REFERENCE IMFM, the first set of NEW IMFM, the modified first set of REFERENCE (IMFM), the modified second set of REFERENCE IMFM, the modified first set of NEW IMFM and the second set of NEW IMFM is indicative of influence of the one or more cooling units and the heat dissipating device on the heat dissipating device. It may be further be understood that, the first set of REFERENCE influence mass fraction metrics (IMFM), the first set of TEST IMFM, the second set of REFERENCE IMFM, the modified first set of REFERENCE IMFM, and the modified second set of REFERENCE IMFM is derived from influence index metrics, and wherein the influence index metrics are obtained through CFD analysis of the data center as described in U.S. application Ser. No. 13/234,763 (now U.S. Pat. No. 8,949,091), incorporated herein by reference.

In one embodiment, the aforementioned description is related to the real-time prediction of thermal-insights for the heat dissipating device in the data center cooled by the one or more cooling units. However, it may be understood that the aforementioned description may be applicable to any multiple inlet-outlet system such as "Heating, Ventilating, and Air conditioning" (HVAC) system of buildings, or pipe networks carrying fluids for predicting the thermal-insights or flow insights such as mass flow rate, a temperature, and insights (qualitative/quantitative) into influence of system sources on the specific locations in the system.

Figure 6A:
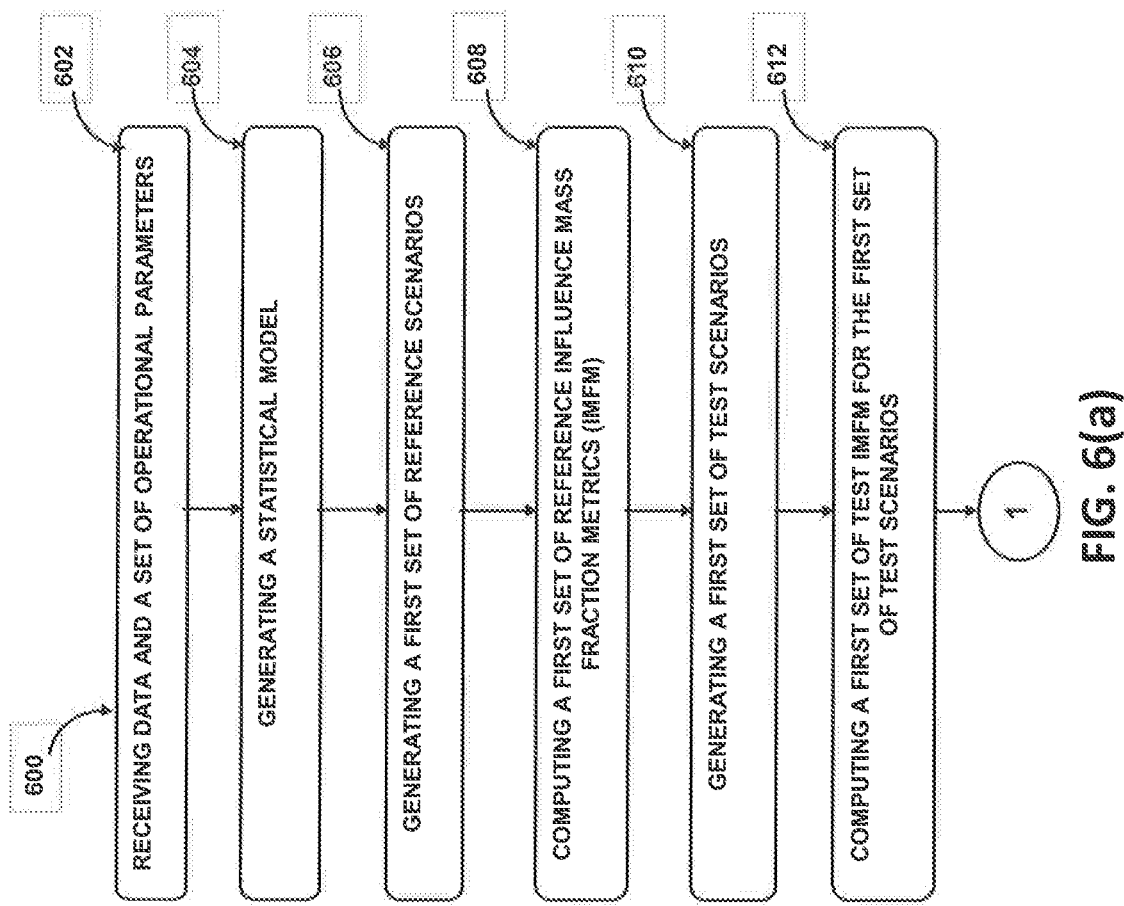
FIGS. 6(a), 6(b) and 6(c) illustrates a method for real-time prediction of the thermal-insights for the heat dissipating device in the data center cooled by the one or more cooling units, in accordance with an embodiment of the present subject matter.
Figure 6B:
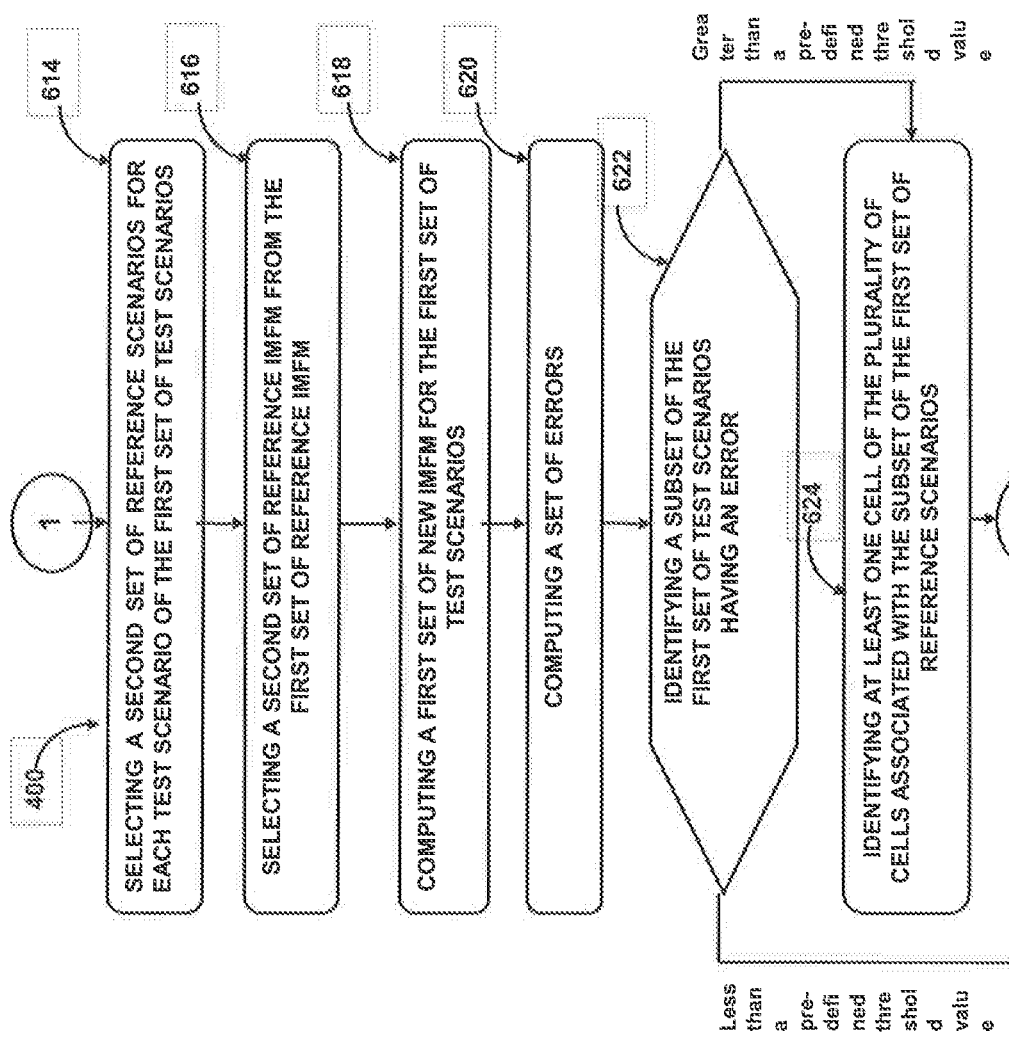
Figure 6C:
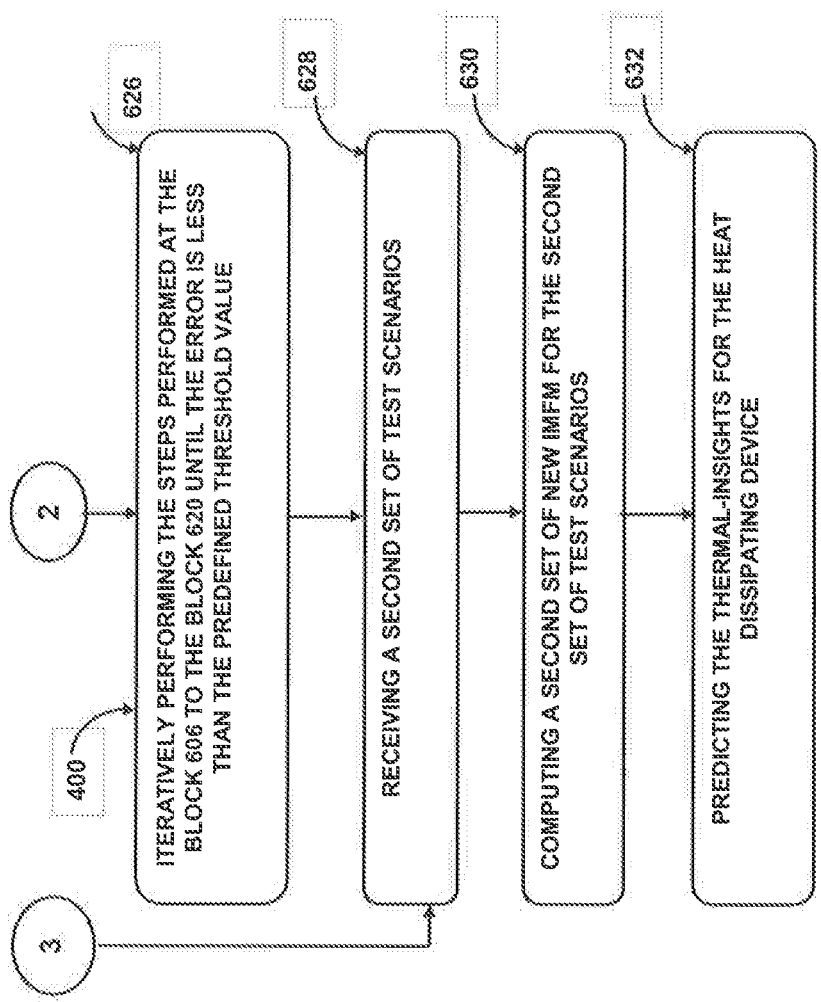

Referring now to FIG. 6, a method 600 for real-time prediction of thermal-insights for a heat dissipating device in a data center cooled by one or more cooling units is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described system 102.

At block 602, data and a set of operational parameters may be received. In one aspect, the data may be associated to the data center and the set of operational parameters may be associated to at least one of a cooling unit or a one or more heat dissipating devices. In one implementation, the data and the set of operational parameters may be received by the statistical model generation module 212 in an offline manner.

At block 604, a statistical model may be generated. In one implementation, the statistical model may be generated based on partitioning of search space into a plurality of cells. In one aspect, the search space may be defined by the set of operational parameters. In one implementation, the data and the set of operational parameters may be received by the statistical model generation module 212 in an offline manner.

At block 606, a first set of reference scenarios may be generated by selecting a set of refinement indices for the statistical model. In one implementation, the first set of reference scenarios may be generated by the first reference scenario generation module 214 in an offline manner.

At block 608, a first set of REFERENCE influence mass fraction metrics (IMFM) for the first set of reference scenarios may be computed. In one aspect, the first set of REFERENCE IMFM may be computed by performing computational fluid dynamics (CFD) simulation for the first set of reference scenarios. In one implementation, the set of REFERENCE influence mass fraction metrics (IMFM) may be computed by the first reference scenario generation module 214 in an offline manner.

At block 610, a first set of test scenarios may be generated. In one aspect, the first set of test scenarios comprises at least one test scenario from each cell of the search space, and wherein each test scenario of the first set of test scenarios comprises of at least one operational parameter bounded by the set of operational parameters. In one implementation, the first set of test scenarios may be generated by the test scenario generation module 216 in an offline manner.

At block 612, a first set of TEST IMFM may be computed for the first set of test scenarios. In one aspect, the first set of TEST IMFM may be computed by performing computational fluid dynamics (CFD) simulation on the first set of test scenarios. In one implementation, the first set of TEST IMFM may be computed by the test scenario generation module 216 in an offline manner.

At block 614, a second set of reference scenarios may be selected for each test scenario of the first set of test scenarios. In one aspect, the second set of reference scenarios may be selected based on the each test scenario and the cell bounding the each test scenario. In one implementation, the second set of reference scenarios may be selected by the second reference scenario generation module 218 in an offline manner.

At block 616, a second set of REFERENCE IMFM may be selected from the first set of REFERENCE IMFM. In one aspect, the second set of REFERENCE IMFM may be associated to the second set of reference scenarios. In one implementation, the second set of REFERENCE IMFM may be selected by the second reference scenario generation module 218 in an offline manner.

At block 618, a first set of NEW IMFM for the first set of test scenarios may be computed by performing Proper Orthogonal Decomposition (POD) computation using the second set of REFERENCE IMFM and at least one test operational parameter for the each test scenario of the first set of test scenarios. In one aspect, the at least one test operational parameter may be bounded by the set of operational parameters. In one implementation, the first set of NEW IMFM may be computed by the Proper Orthogonal Decomposition (POD) module 220 in an offline manner.

At block 620, a set of errors may be computed by comparing the first set of NEW IMFM with the first set of TEST IMFM. In one aspect, each error of the set of errors corresponds to a test scenario of the first set of test scenarios. In one implementation, set of errors may be computed by the error computation module 222 in an offline manner.

At block 622, a subset of the first set of test scenarios may be identified. In one aspect, the subset may be having an error greater than a pre-defined threshold value subset. In one implementation, the subset may be identified by the error computation module 222 in an offline manner.

At block 624, at least one cell of the plurality of cells associated with the subset of the first set of reference scenarios may be identified. In one implementation, the at least one cell of the plurality of cells may be identified by the error computation module 222 in an offline manner.

At block 626, iteratively performing the steps performed at the block 606 to the block 620 until the error is less than the predefined threshold value. In one implementation, the steps performed at the block 606 to the block 620 may be iteratively by the error computation module 222 in an offline manner.

At block 628, a second set of test scenarios may be received in real-time. In one implementation, the second set of test scenarios may be received by the thermal prediction module 324.

At block 630, a second set of NEW IMFM for the second set of test scenarios may be computed, in real-time, by performing the POD computation using the at least one test operational parameter for each of the test scenarios of the second set of test scenarios and one of the second set of REFERENCE IMFM or the modified second set of REFERENCE IMFM. In one implementation, the second set of test scenarios may be received by the thermal prediction module 224.

At block 632, the thermal-insights for the heat dissipating device may be predicted, in real-time, based upon the second set of NEW IMFM and the data. In one implementation, the thermal-insights may be predicted by the thermal prediction module 224.

Although implementations for methods and systems for real-time prediction of thermal-insights for a heat dissipating device in a data center cooled by one or more cooling units have been described in language specific to structural features and/or methods, it is to be understood that the appended claims are not necessarily limited to the specific features or methods described. Rather, the specific features and methods are disclosed as examples of implementations for real-time prediction of thermal-insights.

Exemplary embodiments discussed above may provide certain advantages. Though not required to practice aspects of the disclosure, these advantages may include those provided by the following features.

Some embodiments enable a system and a method for real time and accurate prediction of thermal insights for a heat dissipating device in a data center with a limited and one-time offline computational effort.

An embodiment also enables exact quantification of the amount of offline computational effort for a given accuracy requirement of the prediction. It also provides an explicit control for tuning and achieving the desired trade-off between the accuracy levels of prediction for any test scenario within the given range and the offline computational effort required.

Another embodiment enables prediction of thermal insights up to the desired accuracy level for any given test scenario within the provided range of operational parameters.

One embodiment comprises a concept of using influence mass fractions as a variable in the Proper Orthogonal Decomposition methodology, simplifying the calculations. The present subject may further enables prediction of thermal and flow insights including mass flow rates, temperature and influence map of air sources by solving for only one variable i.e influence mass fraction.

We claim:

1. A method for real-time prediction of thermal-insights for one or more heat dissipating devices in a data center cooled by one or more cooling units using a processor, the method comprising:

(a) receiving data and a set of operational parameters, wherein the data is associated to the data center, and wherein the set of operational parameters is associated to at least one of the cooling units or the one or more heat dissipating devices;

(b) generating, via the processor, a statistical model, wherein the statistical model is generated based on partitioning of search space into a plurality of cells, and wherein the search space is defined by the set of operational parameters;

(c) generating, via the processor, a first set of reference scenarios by selecting a set of refinement indices for the statistical model, wherein the set of refinement indices is associated with local sub-partitioning of the plurality of cells;

(d) computing, via the processor, a first set of REFERENCE influence mass fraction metrics (IMFM) for the first set of reference scenarios, wherein the first set of REFERENCE IMFM is computed by performing computational fluid dynamics (CFD) simulation for the first set of reference scenarios;

(e) generating, via the processor, a first set of test scenarios, wherein the first set of test scenarios comprises at least one test scenario from each cell of the search space, and wherein each test scenario of the first set of test scenarios comprises of at least one operational parameter bounded by the set of operational parameters;

(f) computing, via the processor, a first set of TEST IMFM for the first set of test scenarios, wherein the first set of TEST IMFM is computed by performing computational fluid dynamics (CFD) simulation on the first set of test scenarios;

(g) selecting, via the processor, a second set of reference scenarios for each test scenario of the first set of test scenarios based on each test scenario and the cell bounding each test scenario;

(h) selecting, via the processor, a second set of REFERENCE IMFM from the first set of REFERENCE IMFM, wherein the second set of REFERENCE IMFM is associated to the second set of reference scenarios;

(i) computing, via the processor, a first set of NEW IMFM for the first set of test scenarios by performing Proper Orthogonal Decomposition (POD) computation using the second set of REFERENCE IMFM and at least one test operational parameter for the each test scenario of the first set of test scenarios, wherein the at least one test operational parameter is bounded by the set of operational parameters;

(j) computing, via the processor, a set of errors by comparing the first set of NEW IMFM with the first set of TEST IMFM, wherein each error of the set of errors corresponds to a test scenario of the first set of test scenarios;

(k) identifying, via the processor, a subset of the first set of test scenarios having an error greater than a predefined threshold value;

(l) identifying, via the processor, at least one cell of the plurality of cells associated with a subset of the first set of reference scenarios;

(m) iteratively performing, via the processor, the steps of (c), (d), (e), (f), (g), (h), (i), (j), (k), (l) and (m) based on the at least one cell in order to:

generate a modified first set of reference scenarios by selecting a modified set of refinement indices;

compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, compute a modified set of errors,
wherein the steps of (c), (d), (e), (f), (g), (h), (i), (j), (k), (l) and (m) are iteratively performed until the error is less than the predefined threshold value;

(n) receiving a second set of test scenarios;

(o) computing, via the processor, a second set of NEW IMFM for the second set of test scenarios by performing the POD computation using the at least one test operational parameter for each of the test scenarios of the second set of test scenarios and one of the second set of REFERENCE IMFM or the modified second set of REFERENCE IMFM; and (p) predicting, via the processor, the thermal-insights for the one or more heat dissipating devices based upon the second set of NEW IMFM and the data.

2. The method of claim 1, wherein the thermal-insights is selected from a group comprising of a mass flow rate, a temperature, an insights into thermal influence of air sources on the one or more heat dissipating devices and a combination thereof.

3. The method of claim 1, wherein the one or more heat dissipating devices are selected from group comprising of a server, a computer, a rack housing the server, and a combination thereof.

4. The method of claim 1, wherein the cooling unit is a computer room air conditioner (CRAC).

5. The method of claim 1, wherein the data comprises geometrical information of the data center, configuration data associated to the one or more heat dissipating devices, data associated to the cooling unit and data required for creating a computational fluid dynamics simulation of the data center.

6. The method of claim 1, wherein the set of operational parameters comprises a minimum operational mass flow rate of the cooling unit or the one or more heat dissipating devices and a maximum operational mass flow of the cooling unit or the one or more heat dissipating devices.

7. The method of claim 1, wherein the cell represents the search space partition bounded by a scenario, wherein the scenario comprises at least one operational parameter bounded by the set of operational parameters.

8. The method of claim 1, wherein the first set of REFERENCE influence mass fraction metrics (IMFM), the first set of TEST IMFM, the second set of REFERENCE IMFM, the first set of NEW IMFM, the modified first set of REFERENCE (IMFM), the modified second set of REFERENCE IMFM, the modified first set of NEW IMFM and the second set of NEW IMFM is indicative of influence of the one or more cooling units and the one or more heat dissipating devices.

9. The method of claim 8, wherein the first set of REFERENCE influence mass fraction metrics (IMFM), the first set of TEST IMFM, the second set of REFERENCE IMFM, the modified first set of REFERENCE IMFM, and the modified second set of REFERENCE IMFM is derived from influence index metrics, and wherein the influence index metrics are obtained through CFD analysis of the data center.

10. The method of claim 1, wherein the second set of reference scenarios is a subset of the first set of reference scenarios, and wherein the second set of REFERENCE IMFM is a subset of the first set of REFERENCE IMFM.

11. A system for real-time prediction of thermal-insights for one or more heat dissipating devices in a data center cooled by one or more cooling units, the system comprising:
a processor;
a memory coupled to the processor, wherein the processor is configured to:
receive data and a set of operational parameters, wherein the data is associated to the data center, and wherein the set of operational parameters is associated to at least one of the cooling units or the one or more heat dissipating devices; and
generate a statistical model, wherein the statistical model is generated based on partitioning of search space into a plurality of cells, and wherein the search space is defined by the set of operational parameters;
generate a first set of reference scenarios by selecting a set of refinement indices for the statistical model, wherein the set of refinement indices is associated with local sub-partitioning of the plurality of cells; and
compute a first set of REFERENCE influence mass fraction metrics (IMFM) for the first set of reference scenarios, wherein the first set of REFERENCE IMFM is computed by performing computational fluid dynamics (CFD) simulation for the first set of reference scenarios;
generate a first set of test scenarios, wherein the first set of test scenarios comprises at least one test scenario from each cell of the search space, and wherein each test scenario of the first set of test scenarios comprises of at least one operational parameter bounded by the set of operational parameters; and
compute a first set of TEST IMFM for the first set of test scenarios, wherein the first set of TEST IMFM is computed by performing computational fluid dynamics (CFD) simulation on the first set of test scenarios;
select a second set of reference scenarios for each test scenario of the first set of test scenarios based on the each test scenario and the cell bounding the each test scenario; and
select a second set of REFERENCE IMFM from the first set of REFERENCE IMFM, wherein the second set of REFERENCE IMFM is associated to the second set of reference scenarios;
compute a first set of NEW IMFM for the first set of test scenarios by performing Proper Orthogonal Decomposition (POD) computation using the second set of REFERENCE IMFM and at least one test operational parameter for the each test scenario of the first set of test scenarios, wherein the at least one test operational parameter is bounded by the set of operational parameters;
compute a set of errors by comparing the first set of NEW IMFM with the first set of TEST IMFM, wherein each error of the set of errors corresponds to a test scenario of the first set of test scenarios;
identify a subset of the first set of test scenarios having an error greater than a pre-defined threshold value;
identify at least one cell of the plurality of cells associated with a subset of the first set of reference scenarios; and
generate a modified first set of reference scenarios by selecting a modified set of refinement Indices;
compute a modified first set of REFERENCE influence mass fraction metrics (IMFM),
generate a modified first set of test scenarios,
compute a modified first set of test IMFM,
select a modified second set of reference scenarios,
select a modified second set of REFERENCE IMFM,
compute a modified first set of NEW IMFM,
compute a modified set of errors,
receive a second set of test scenarios;

compute a second set of NEW IMFM for the second set of test scenarios by performing the POD computation using the at least one test operational parameter for each of the test scenarios of the second set of test scenarios and one of the second set of REFERENCE IMFM or the modified second set of REFERENCE IMFM; and predict the thermal-insights for the one or more heat dissipating devices based upon the second set of NEW IMFM and the data.

12. The system of claim 11 further comprising a system database for storing the pre-defined threshold value.

13. A non-transitory computer program product having embodied thereon a computer program for real-time prediction of thermal-insights for one or more heat dissipating devices in a data center cooled by one or more cooling units, the computer program product storing instructions, the instructions, when executed by at least one processor, cause the at least one processor to perform a method comprising:

a) receiving data and a set of operational parameters, wherein the data is associated to the data center, and wherein the set of operational parameters is associated to at least one of the cooling units or the one or more heat dissipating devices;

b) generating a statistical model, wherein the statistical model is generated based on partitioning of search space into a plurality of cells, and wherein the search space is defined by the set of operational parameters;

c) generating a first set of reference scenarios by selecting a set of refinement indices for the statistical model, wherein the set of refinement indices is associated with local sub-partitioning of the plurality of cells;

d) computing a first set of REFERENCE influence mass fraction metrics (IMFM) for the first set of reference scenarios, wherein the first set of REFERENCE IMFM is computed by performing computational fluid dynamics (CFD) simulation for the first set of reference scenarios;

e) generating a first set of test scenarios, wherein the first set of test scenarios comprises at least one test scenario from each cell of the search space, and wherein each test scenario of the first set of test scenarios comprises of at least one operational parameter bounded by the set of operational parameters;

f) computing a first set of TEST IMFM for the first set of test scenarios, wherein the first set of TEST IMFM is computed by performing computational fluid dynamics (CFD) simulation on the first set of test scenarios;

g) selecting a second set of reference scenarios for each test scenario of the first set of test scenarios based on the each test scenario and the cell bounding the each test scenario;

(h) selecting a second set of REFERENCE IMFM from the first set of REFERENCE IMFM, wherein the second set of REFERENCE IMFM Is associated to the second set of reference scenarios;

(i) computing a first set of NEW IMFM for the first set of test scenarios by performing Proper Orthogonal Decomposition (POD) computation using the second set of REFERENCE IMFM and at least one test operational parameter for the each test scenario of the first set of test scenarios, wherein the at least one test operational parameter is bounded by the set of operational parameters;

(j) computing a set of errors by comparing the first set of NEW IMFM with the first set of TEST IMFM, wherein each error of the set of errors corresponds to a test scenario of the first set of test scenarios;

(k) identifying a subset of the first set of test scenarios having an error greater than a pre-defined threshold value;

(l) identifying at least one cell of the plurality of cells associated with a subset of the first set of reference scenarios;

(m) iteratively performing the steps of (c), (d), (e), (f), (g), (h), (i), (j), (k), (l) and (m) based on the at least one cell in order to:

generate a modified first set of reference scenarios by selecting a modified set of refinement indices, compute a modified first set of REFERENCE influence mass fraction metrics (IMFM), generate a modified first set of test scenarios, compute a modified first set of test IMFM, select a modified second set of reference scenarios, select a modified second set of REFERENCE IMFM, compute a modified first set of NEW IMFM, compute a modified set of errors, wherein the steps of (c), (d), (e), (f), (g), (h), (i), (j), (k), (l) and (m) are iteratively performed until the error is less than the predefined threshold value;

(n) receiving a second set of test scenarios;

(o) computing a second set of NEW IMFM for the second set of test scenarios by performing the POD computation using the at least one test operational parameter for each of the test scenarios of the second set of test scenarios and one of the second set of REFERENCE IMFM or the modified second set of REFERENCE IMFM; and (p) predicting the thermal-insights for the one or more heat dissipating devices based upon the second set of NEW IMFM and the data.

* * * * *